United States Patent [19]

Chapron et al.

[11] 3,822,384

[45] July 2, 1974

[54] OPTO-ELECTRONIC DEVICE HAVING COUPLED EMITTER AND RECEIVER AND METHOD OF MANUFACTURING SAME

[75] Inventors: Claude Chapron, Caen; Dominique Henri, Epron, both of France

[73] Assignee: U.S. Philips Corporation, New York, N.Y.

[22] Filed: Mar. 14, 1973

[21] Appl. No.: 341,086

[30] Foreign Application Priority Data

Mar. 31, 1972 France ............................ 72.11546

[52] U.S. Cl. ................................ 250/551, 250/239

[51] Int. Cl. ............................................ G02f 1/28

[58] Field of Search ............ 250/211 R, 211 J, 227, 250/239, 217 S; 307/311; 317/235 N; 315/235

[56] References Cited

UNITED STATES PATENTS

| | | | |
|---|---|---|---|
| 3,413,480 | 11/1968 | Biars | 250/217 S |
| 3,430,050 | 2/1969 | Grimmeiss | 250/211 J |
| 3,430,054 | 2/1969 | Klein | 250/217 S |
| 3,522,435 | 8/1970 | Brean | 250/211 J |
| 3,585,454 | 6/1971 | Roberts | 250/211 J |
| 3,622,419 | 11/1971 | London | 250/227 |
| 3,660,669 | 5/1972 | Grenon | 250/217 S |
| 3,727,064 | 4/1973 | Bottini | 250/217 S |

*Primary Examiner*—James W. Lawrence
*Assistant Examiner*—D. C. Nelms
*Attorney, Agent, or Firm*—Frank R. Trifari

[57] ABSTRACT

An opto-electric photocoupler device comprising a light emitter and receiver.

The device is essentially characterized in that the emitter and the receiver are soldered opposite to each other on the two parallel faces of a support having a shape substantially in the form of a U.

Application: Card readers – electronic switches.

2 Claims, 1 Drawing Figure

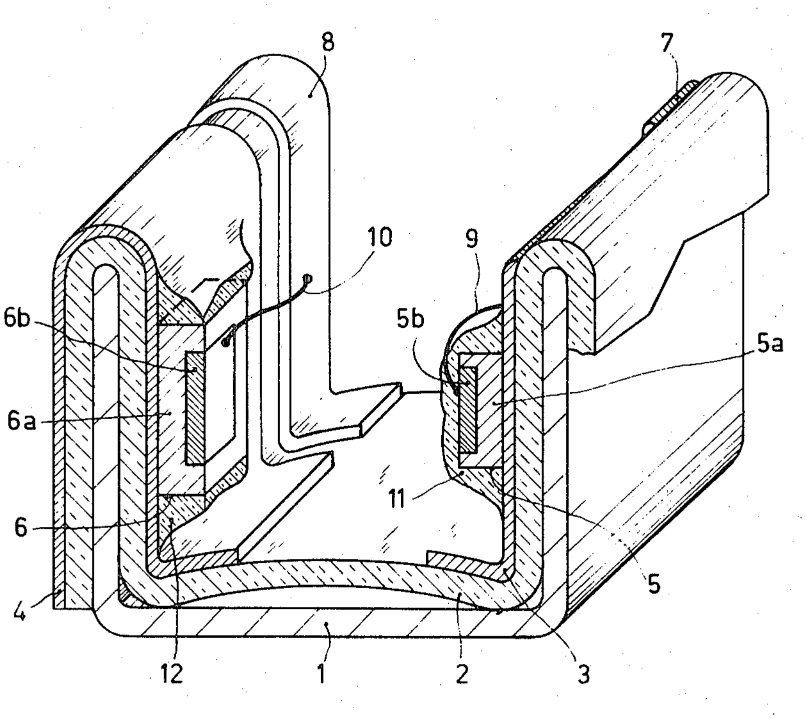
8
7
10
9
6b
5b
5a
6a
11
6
5
4
12
1
2
3

OPTO-ELECTRONIC DEVICE HAVING COUPLED EMITTER AND RECEIVER AND METHOD OF MANUFACTURING SAME

The present invention relates to an opto-electronic device comprising a light emitter and a photosensitive receiver which are coupled together optically and mechanically.

The present invention also relates to the method of manufacturing said device.

Several opto-electronic combinations are known which are composed of an emitter and a receiver which are coupled optically so as to transfer, through a light signal, an electric signal of a first circuit to a second circuit which is entirely insulated from the first. When a mask is interposed which comprises perforations between the emitter and the receiver, the said emitter and receiver may also be used in association as switches in electric or electronic circuits.

Said so-called "photo-coupler" combinations usually use an electro-luminescent diode as an emitter and a photo-diode, a photo-transistor or a photo-resistor as a receiver, the said emitter and receiver being generally semiconductors.

It is already known to unite the photo-sensitive element mechanically and otically by a light wave guide. The various proposed solutions use as a guide either a photo-conductive optical fibre, or even an intermediate element, an index adaptor.

Since the optical fibres or the index adaptors are not constituted by a perfectly homogeneous material, losses occur by transmission and reflection which influence the transfer characteristics of the photo-coupler device.

From a mechanical point of view, the most frequently used type of mounting consists in face-to-face assembly of two crystals, one the emitter, the other the receiver, the photo-coupler device thus constituted being then disposed in an evacuated envelope.

Such a type of assembly cannot be used in all the applications of a photo-coupler; actually, on the one hand it has comparatively large dimensions and on the other hand, taking into account the fact that the connections of the upper crystal are connected to the output terminals of the base supporting the lower crystal and that the two crystals are connected by a transparent cement, it is impossible to use such a type of photo-coupler as a switch.

In said type of photo-coupler the operation of placing the emitter and the receiver on the same optical axis is extremely delicate and comparatively aleatory, resulting thus in small production outputs.

Moreover, the thermal dissipation of one of the crystals is small since the said crystal is not in contact with any metallic element, except for its connections. Moreover, the transfer efficiency, depending considerably on the distance between the emission face and the reception face and on their parallelism, is subject to considerable variations for each assembly, said distance being determined only be approximation.

Finally, said type of coaxial mounting of two crystals, starting from the conventional technology of the semiconductor components (planar or integrated circuits), does not permit of using the equipments and substructures perfected in said industry.

Another type of assembly is thus used which permits of obviating, at least partly, a certain number of inconveniences presented by the preceding type of assembly. It consists of placing opposite to each other a light emitter and a receiver which are each soldered on a different metallic base.

In this case, the space of the assembly of the photo-coupler device is very large and the said device cannot be placed in electric or electronic miniature apparatus.

The alignment of the said emitter and receiver on the same optical axis is a very delicate operation and the same applies to their location at the suitable distance and according to parallel planes.

It is the object of the present invention to obviate said drawbacks efficaciously and to permit of obtaining correct optical coupling devices by a simple mounting method.

According to the invention, an opto-electronic device comprising a light emitter and a photo-sensitive receiver which are coupled together optically and mechanically is remarkable in that the emitter and the receiver are solded opposite to each other on the two parallel faces of a support having substantially the shape of a U.

The advantages of such a device are numerous: actually, since the emitter and the receiver are disposed on supports which are fixed and parallel one relative to the other, it is easy to assemble them in a coaxial manner.

Moreover, by choosing the support in a suitable manner, the thermal dissipation can be considerably increased.

In addition, the assembly requires only conventional methods which are currently used for the transistors, notably of the so-called "planar" type or for the integrated circuits.

From the optical point of view, the distance between the emitter and the receiver may be perfectly known and it is also reproducible. Consequently it is possible to make the transfer efficiency excellent.

Finally, the space of such a photo-coupler is highly reduced which permits of using it in miniature apparatus and, taking into account its disposition, its application may be generalized in switch functions.

Advantageously, the U-shaped support is constituted by a metallic plate which is covered with a band of a flexible plastic material which is partially glued to the said plate and comprises metallized surfaces on which the emitter and the receiver are fixed.

In these conditions, the emitter and the receiver may first be easily soldered and with precision on the flexible band, the metallic plate being used only to ensure the U-shape and the mechanical rigidity. Due to said rigidity, the device may also be incorporated, by means of pins, in connectors, in so far as the dimensions of the support and the width of the metallic surfaces of the flexible band are compatible with the standardized distance of the connectors.

In a first preferred embodiment of the invention, the insulating flexible band comprising the crystals is partially glued on a flat metallic plate to which is then given the shape of a U.

In a variation of said embodiment, the metallic plate may also be partially bent, it being given its ultimate U-shape after gluing the flexible band.

Said embodiment is simplest and may be used notably in the case in which a slight error of parallelism of the faces supporting the crystals, so a slight loss of transfer efficiency, does not cause disturbing consequencies.

In a second preferred embodiment of the invention, the insulating flexible band supporting the crystals in glued on a metallic plate which has previously been given the U-shape.

Said embodiment permits of obtaining, with optimum precision, the parallelism of the two faces which have to support the crystals, so of ensuring a good transfer efficiency of the device.

From the following description with reference to the accompanying drawing it will be well understood how the invention can be carried into effect.

The attached FIGURE is a partial perspective sectional view of a device according to the invention.

It is to be noted that in the FIGURE the dimensions are considerably exaggerated and not drawn to scale so as to make the drawing clear.

As shown in the FIGURE, the device according to the invention comprises a plate 1 constituting a mechanical support, for example of aluminium, which has been given the shape of a U. On said plate 1 is glued an insulating and flexible band 2 comprising metallic surfaces 3 and 4 on which are soldered opposite to each other an electroluminescent diode 5 by its region *5a* and a photo-receiver 6 by its region *6a*, respectively.

Metallic surfaces 7 and 8, insulated from the surfaces 3 and 4, permit of ensuring the electric connection, via the wires 9 and 10, with the regions *5b* and *6b* of the diode 5 and the photo-receiver 6.

The flexible band 2 and the metallic surfaces 3, 4, 7 and 8 preferably cover the outer faces of the lateral walls of the plate 1. It is thus possible to fix the device either on a rigid circuit or in one or several connectors.

As regards the photo-receiver 6, it is constituted, in the FIGURE, by a photo-diode; consequently in this case two metal surfaces 4 and 8 are sufficient, but it is evident that, if the photo-receiver is a photo-transistor or a photo-thyristor, it will be necessary to provide three or even four metallic surfaces.

In order to obtain such a device, first a mechanical support 1 is formed starting from a metallic plate, for example of aluminium, which is given the shape of a U, either beforehand or as a last operation, then a flexible insulating band 2 is prepared on which a conductive metallic layer is deposited which is cut to the desired shape, by photo-engraving and chemical attack, to obtain, for example, the surfaces 3, 4, 7 and 8.

After having soldered the crystals 5 and 6 to the surfaces 3 and 4 by their regions *5a* and *6a*, the regions *5b* and *6b* are connected to the surfaces 7 and 8 by the wires 9 and 10, then the band 2 thus prepared is glued, at least by its extremities, on the inner and outer faces of the lateral walls of the plate 1.

If the said plate 1 is already bent, the band 2 automatically takes the form of a U, if not, the assembly is bent to obtain the desired shape.

The method used needs only simple means which are well known to those skilled in the art of semiconductors who have to solder crystals on the metallic bases, and it permits on the one hand to easily centre the crystals one with respect to the other and, on the other hand, to provide them in parallel.

In order to protect the emitter 5 and the receiver 6 from exterior atmospheric agents, they are preferably covered by a transparent layer of lacquer, 11 and 12, respectively, before disposing the flexible band 2 on the plate 1.

What is claimed is:

1. An opto-electronic device, comprising:

a rigid U-shaped metallic plate having at least a portion of the surface of one arm thereof facing and parallel to at least a portion of the surface of the other arm thereof;

flexible insulating sheet material having a metallic surface on one side thereof covering at least said portion of the surface of said one arm and attached thereto on the side remote from said metallic surface;

flexible insulating sheet material having a metallic surface on one side thereof covering at least said portion of the surface of said other arm and attached thereto on the side remote from said metallic surface;

a light emitter attached to said metallic surface of said sheet material covering said portion of the surface of said one arm;

a photosensitive receiver attached to the metallic surface of said sheet material covering said portion of the surface of said other arm and in optical alignment with said light emitter.

2. An opto-electronic device as defined in claim 1 wherein said light emitter and said photosensitive receiver are attached to said metallic surfaces by soldering.

* * * * *